Figure 1:
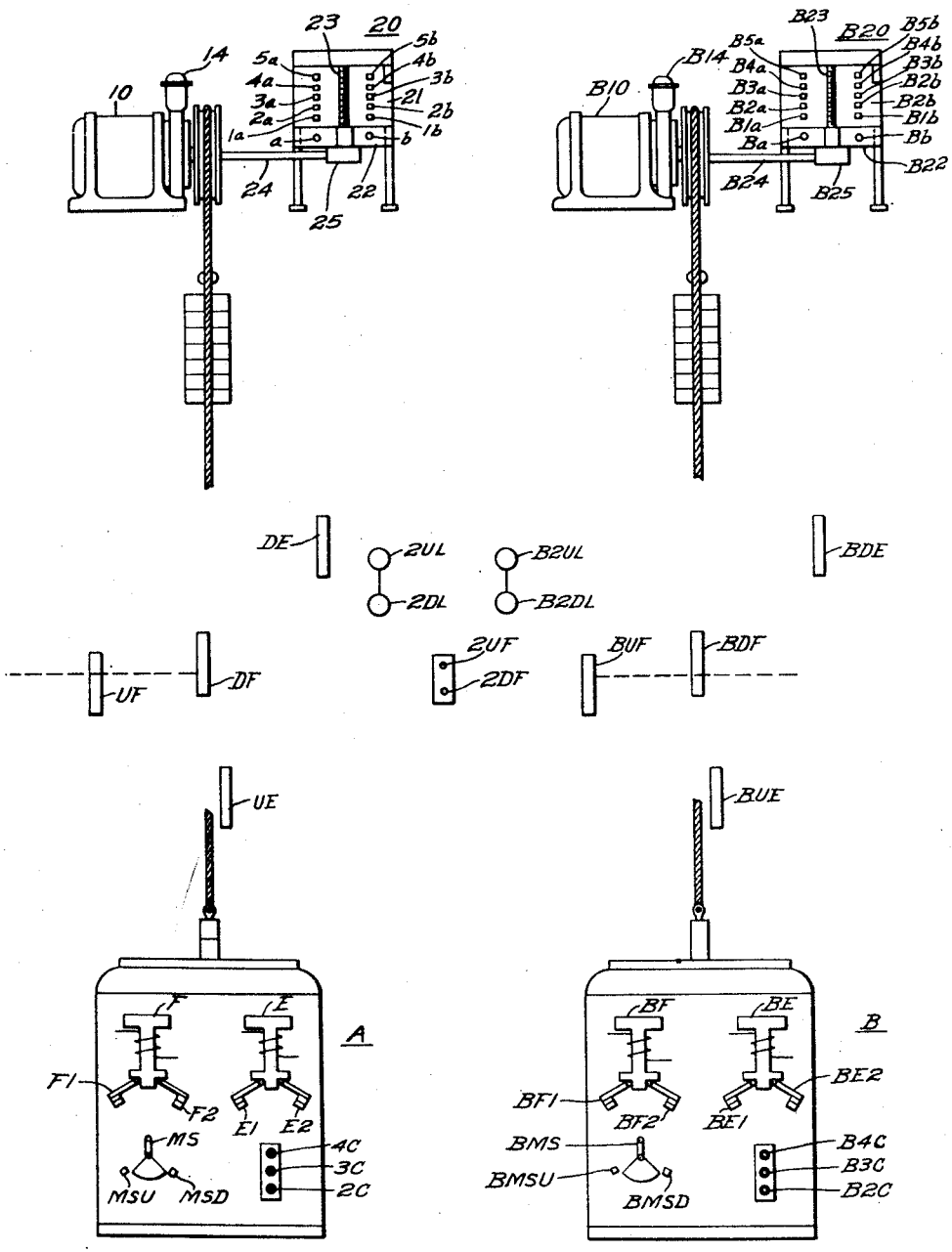

Jan. 4, 1938.    W. F. EAMES    2,104,478
ELEVATOR CONTROL SYSTEM
Filed Dec. 1, 1934    9 Sheets-Sheet 4

INVENTOR
William F. Eames.

Jan. 4, 1938.  W. F. EAMES  2,104,478
ELEVATOR CONTROL SYSTEM
Filed Dec. 1, 1934  9 Sheets-Sheet 5

WITNESSES:

INVENTOR
William F. Eames.
BY
ATTORNEY

Jan. 4, 1938. W. F. EAMES 2,104,478
ELEVATOR CONTROL SYSTEM
Filed Dec. 1, 1934 9 Sheets-Sheet 6

INVENTOR
William F. Eames.
BY
ATTORNEY

Jan. 4, 1938.  W. F. EAMES  2,104,478
ELEVATOR CONTROL SYSTEM
Filed Dec. 1, 1934   9 Sheets-Sheet 7

WITNESSES:

INVENTOR
William F. Eames.
BY
ATTORNEY

Patented Jan. 4, 1938

2,104,478

UNITED STATES PATENT OFFICE 2,104,478

ELEVATOR CONTROL SYSTEM

William F. Eames, Edgewood, Pa., assignor to Westinghouse Electric Elevator Company, Chicago, Ill., a corporation of Illinois Application December 1, 1934, Serial No. 755,578

33 Claims. (Cl. 187—29)

The present invention relates to systems of control for electric elevators and more particularly to such systems in which a number of elevator cars operating together as a bank are controlled by passenger-operated push buttons located at the various floor landings.

Many systems have been developed in which push buttons located at the various floors of the building are effective to cause the stopping of one or more elevator cars which serve the corresponding floors. In certain of these systems, the push buttons at the floor landings are associated with all of the cars of the bank and cause the stopping of a selected one of such cars upon its approach to the corresponding floor, traveling in the corresponding direction. In others, push buttons individual to each car are located at the floor landings, and operation of any button is effective to stop only the corresponding car, as disclosed in the copending application of Edgar M. Bouton and William F. Eames, Serial No. 688,784, filed September 9, 1933, and assigned to the Westinghouse Electric Elevator Company.

The systems in which the push buttons are common to all of the cars have been alternatively arranged so that operation of the button registers a call which is available to any of the cars of the bank, but which is not appropriated to any particular car until one of the cars approaches within a certain distance of the corresponding floor; or so that operation of any button registers a call which is immediately appropriated to a particular car, usually the car which is nearest the corresponding floor at the time the call is registered. These alternative arrangements are disclosed respectively in Reissue Patent No. 18,987, granted to Edgar M. Bouton November 7, 1933 and in the patent of William F. Eames, No. 2,066,930, assigned to the Westinghouse Electric Elevator Company.

In the operation of each of the systems mentioned above, there is a tendency for the several elevator cars to distribute the building traffic unevenly, and in the taller buildings, for the cars to become "bunched" and thus disrupt the intended spacing between the cars.

These systems also tend to provide better service at certain floors than at others, particularly during the noon and evening rush periods at which times a relatively large number of calls are registered at practically all floors of the building within a relatively short period of time. At such rush periods each elevator is filled to capacity by a relatively few stops, perhaps three or four. Each car is usually required to make these few stops at the upper floors and so passes the lower floors without stopping. Because of the frequency with which calls are registered, it has been found that the next car of the series is also filled to capacity by three or four stops at upper floors and so passes the lower floors without stopping. In the operation of these systems, therefore, the response to calls registered from lower floors of the building is delayed until most of the traffic from the upper floors has received attention.

In accordance with the present invention, the number of stops which each car shall make in the course of a trip is predetermined, and the several stops are determined by the order in which the calls are registered. The limitation as to the number of calls to which a car responds tends to make the spacing between cars more uniform, and to equalize the traffic distribution between the cars. The feature of determining what stops a particular car shall make in accordance with the order in which calls are registered prevents intending passengers at upper floors from monopolizing the elevator cars during rush periods, and tends to make the service given to all floors more uniform.

The present invention is illustrated as applied to a system in which the push buttons at the landings may be selectively connected to control any one of the cars of the bank. Operation of any button registers a call which is immediately appropriated to the car nearest the corresponding floor traveling in the corresponding direction, or, in the event no cars are approaching that floor from such corresponding direction, to the leading car traveling in the other direction. These registered calls prepare circuits which cause the car to which they are appropriated to stop at the corresponding floors.

These registered calls also control mechanism which may be called the quota mechanism. As soon as a particular car has appropriated to it a certain number of registered calls, the quota mechanism operates to prevent receipt by that car of further calls.

The calls which are to be included in a particular car's quota are determined by the relative times of registration of the calls in the zone for that car. Accordingly the calls entering a given car's quota are distributed throughout the building, and include calls for the lower floors of the building, as well as for the upper floors.

In accordance with the preferred embodiment of the present invention, the quota mechanism, after having been operated, remains in operated condition until the corresponding car reaches a terminal floor. Also the quota is automatically adjusted throughout the day by mechanism which responds to the number of unanswered calls which exist at any particular time.

In certain instances, it has been found desirable to provide separate up and down quota mechanism so that a particular car may receive, on any particular trip, one quota of up calls and a separate quota of down calls. In the illustrated embodiment, however, a single quota mechanism for each car is provided which is affected by both up and down calls, regardless of the relative number of up and down calls which may be included in such quota.

The quota mechanism may be alternatively arranged to operate as soon as the required number of calls have been appropriated to the corresponding car, although some of such calls may have been answered prior to registration of certain of the required number; or, to operate only in the event that the corresponding car has appropriated to it the required number of unanswered calls.

It is accordingly an object of the present invention to provide an elevator control system in which the number of calls to be answered by a particular car may be predetermined.

A further object of the present invention is to provide such a system in which, after the car has responded to a certain number of calls, response thereof to other calls is prevented.

It is a further object of the present invention to provide such a system in which response to further calls is prevented either until a particular car reaches the terminal floor or until all or part of its quota of calls has been responded to.

A further object of the present invention is to provide such a system in which the number of calls included in the quota for a particular car may be adjusted in accordance with varying traffic conditions.

Other objects and advantages of the present invention appear in the following description and apended claims.

Referring to the drawings,

Figure 1 is a diagrammatic illustration of certain of the mechanical elements which may be used in the practice of the present invention, Figs. 2, 3, 4, and 5, jointly illustrate a complete control system for two cars arranged in accordance with the present invention. These figures may conveniently be placed one above the other, in the order mentioned, with Fig. 2 at the top, and Figs. 6, 7, 8, and 9 are key sheets intended as a guide in locating operating coils and contacts shown on Figs. 2, 3, 4, and 5, respectively, and show the mechanical relationship between any operating coil and the contacts associated with it. In Figs. 6 through 9 all coils and contact members are given the same horizontal positions on the sheets as the corresponding contact members shown in Figs. 2 through 5, respectively.

The reference characters also serve as a guide to the relation between coils and contacts. For example, coil IUR operates contacts IUR1, IUR2, IUR3, etc.

Except where otherwise specified, in the following description, each of the relays or switches shown in the drawings, are of the usual electromagnetically operated type, comprising an operating electromagnet and a cooperating contact-carrying armature. Throughout the drawings, the contact members are shown in the position occupied thereby when the corresponding switch is in the deenergized condition. Contacts open under these conditions are illustrated by two short and slightly spaced segments, and contacts closed under these conditions are illustrated by a small circular element having a short straight line drawn through the center.

*Description of apparatus*

The system illustrated in the drawings is arranged for controlling two cars A and B. The control systems individual to the two cars are identical and corresponding elements in each are given similar reference characters, except that for car B, each reference character is given a prefix B.

The control systems illustrated for the respective cars are of the type in which the car is started by means of a manually operable switch on the car and thereafter continues in operation until a stop is initiated either in response to operation of an associated car button or in response to a hall button. The particular motor control systems employed form no part of the present invention, but have been illustrated, in Fig. 2, as being of the variable voltage or Ward-Leonard type, utilizing inductor switches to initiate the slow-down and stopping operations.

Figure 2:
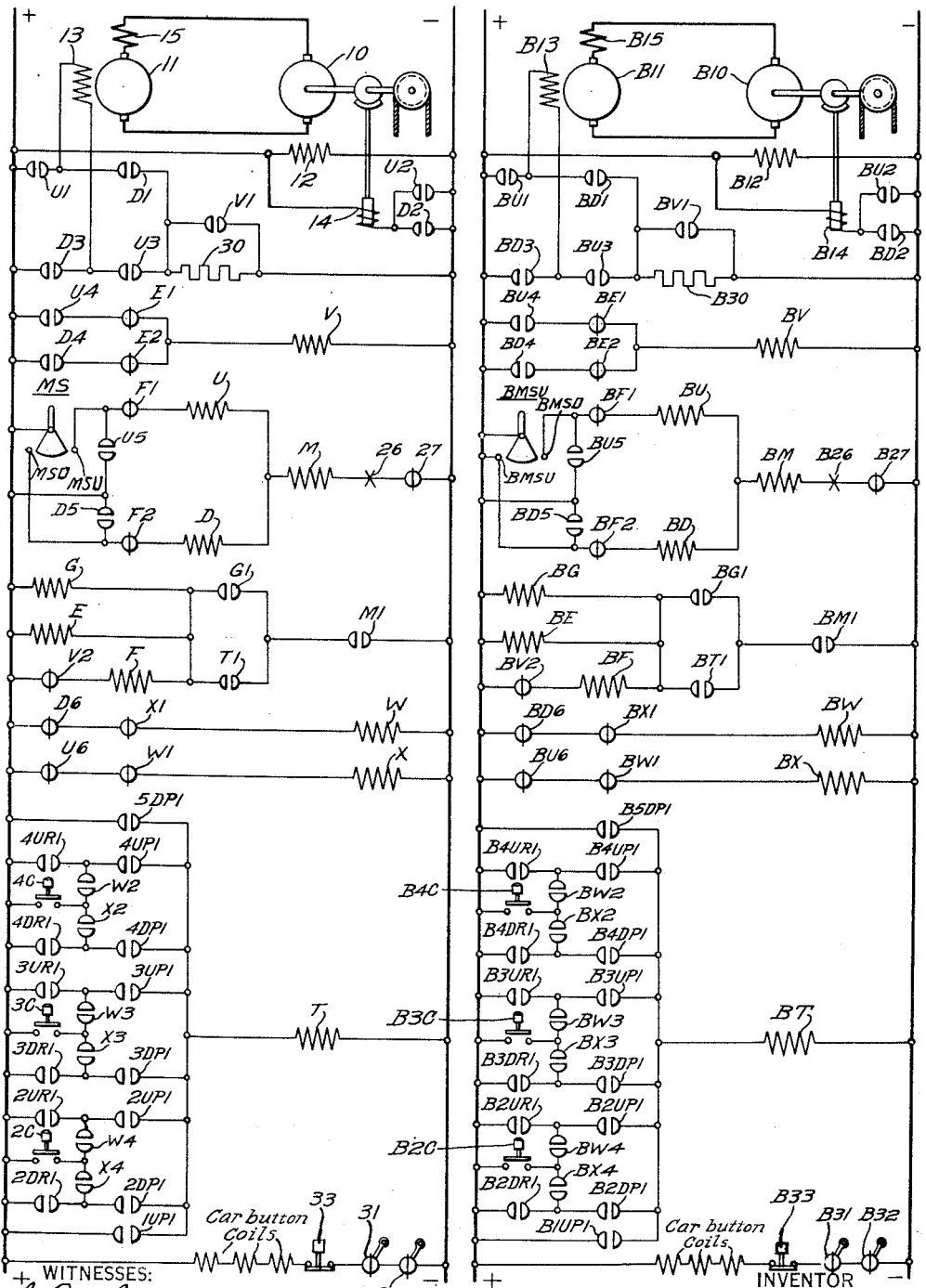

Referring to the left-hand half of Fig. 2, the control system for car A comprises a motor 10, the armature of which is connected in series with the armature of a generator 11. Motor 10 is provided with a field winding 12, which for purposes of description, has been illustrated as directly connected across two line conductors marked + and —. Generator 11 is provided with a separately excited field winding 13, the polarity and degree of excitation of which may be selectively controlled by means of up and down reversing switches U and D, and a speed switch V, to thereby control the direction and speed of motor 10. The usual electromagnetically released spring applied brake 14 is associated with motor 10. The system preferably embodies some form of speed regulating mechanism to render the operating speed of motor 10 substantially independent of the load on the elevator car, and this mechanism, for convenience, has been illustrated as comprising a cumulative series field winding 15 associated with generator 11.

Reversing switches U and D, and speed switch V are controlled in starting by means of a master switch MS, carried on the car as shown in Fig. 1, and having up contacts MSU and down contacts MSD. These switches are controlled during slow-down and stopping by means of a slow-down inductor switch E and a stopping inductor switch F, both of which are carried upon the elevator car.

Inductor switches E and F are preferably of the type disclosed in Patent No. 1,902,602, granted March 21, 1933 to Williams, et al. and assigned to the Westinghouse Electric Elevator Company. As there described, and as shown diagrammatically in Fig. 1, each inductor switch comprises an electromagnet and two contact-carrying armatures disposed in the magnetic circuit thereof. The arrangement of the switch is such that energization of the electromagnet has no immediate effect upon the positions of the associated armatures. When, however, the switch is moved into the region of a magnetizable plate associated with either armature, that armature moves to a contact-opening position. Preferably also, the armature remains in the contact-opening position, after having been initially moved thereto, as long as the electromagnet remains energized, even though the switch is moved out of the region of the plate.

Inductor switch E is provided with an up armature E1 and a down contact armature E2, and inductor switch F is provided with corresponding up and down armatures F1 and F2. An inductor plate UE for each intermediate floor and the upper terminal floor is associated with armature E1, and a corresponding inductor plate DE individual to each intermediate floor and the lower terminal floor is associated with armature E2. An inductor plate UF for each intermediate floor and the upper terminal floor is associated with armature F1, and an inductor plate DF for each intermediate floor and the lower terminal floor is associated with armature F2. A single complete set of such plates is illustrated in Fig. 1.

The inductor plates associated with switch E are located in the hatchway in such position as to cause an operation of the corresponding armature when the car reaches the slowdown points for the respective floors, traveling in the corresponding direction, and the plates associated with switch F are located in the hatchway in such positions as to cause an operation of the corresponding armature just before the car reaches the respective floors, traveling in the corresponding direction.

Referring again to Fig. 2, the coils of inductor switches E and F are arranged to be controlled by means of a stopping relay T, a holding relay G, and an auxiliary control relay M. Relay T, in turn, is arranged to be selectively operated as the car approaches floors for which the calls are registered in response to maually closable buttons 2C, 3C and 4C, which are located upon the car, and one of which is provided for each intermediate floor, or in response contacts 4UR1, etc., of the floor relays, later described. Contacts 1UP1, 3DP1, etc., on a series of car position relays, later described, commutate the operating circuits for relay T as the car approaches the several floors traveling upwardly or downwardly.

Figure 3:
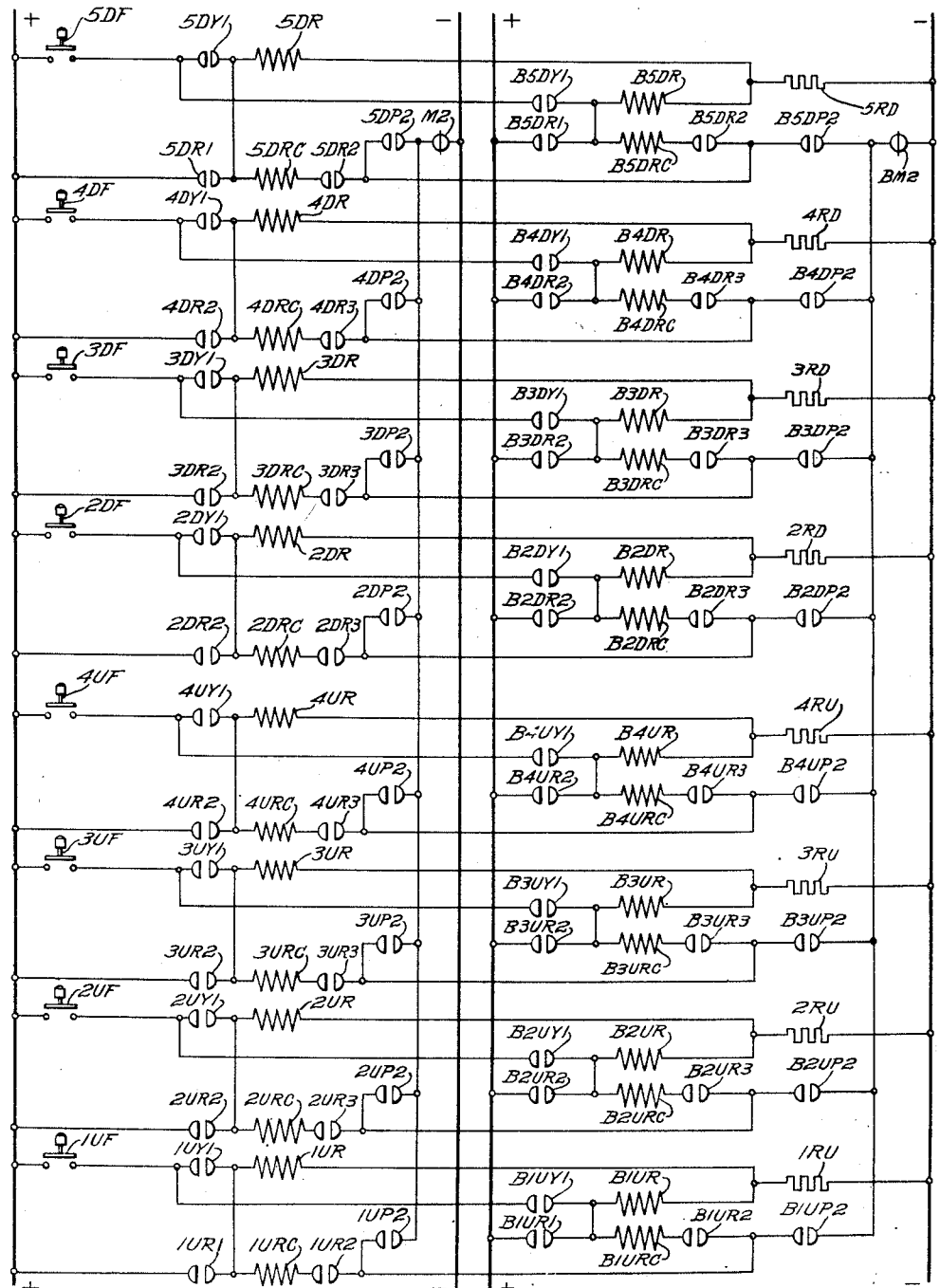

Referring to Fig. 3, each car is provided with an up floor relay for each intermediate floor and the lower terminal floor, and with a down floor relay for each intermediate floor and the upper terminal floor. Each floor relay comprises an operating coil and a resetting coil. The relay is arranged to move to the actuated position upon energization of the operating coil and to resume the deenergized position upon energization of the resetting coil, which acts to magnetically oppose the effect of the operating coil.

The drawings illustrate a system arranged for three intermediate floors, and upper and lower terminal floors, and the up floor relays operating coils for car A are designated 1UR, 2UR, 3UR and 4UR. The down floor relays operating coils for car A are designated 2DR, 3DR, 4DR and 5DR. The resetting coils for these floor relays are shown immediately below the corresponding operating coils and have the same reference characters with the suffix C. The corresponding operating and resetting coils for the floor relays associated with car B are shown in the right-hand side of Fig. 3 and have the same reference characters as those associated with car A, with the prefix B.

As shown in Fig. 3, the floor relays for cars A and B are connected in parallel for actuation by push buttons corresponding to the various floor landings, the up floor buttons being designated 1UF, 2UF, 3UF and 4UF, and the down floor buttons being designated 2DF, 3DF, 4DF and 5DF. The connections between the push buttons and the floor relay operating coils include contacts 5DY1, B5DY1, 4UY1, 4DY1 and B4DY1, etc., of the zoning relays associated respectively with cars A and B, and also include selective resistors 5RD, 4RU, etc., the purpose of which is later described. As is more fully described hereinafter, the zoning relay contacts 5DY1, 4DY1, etc., determine to which of the cars of a bank a particular registered floor call shall be appropriated.

Figure 4:
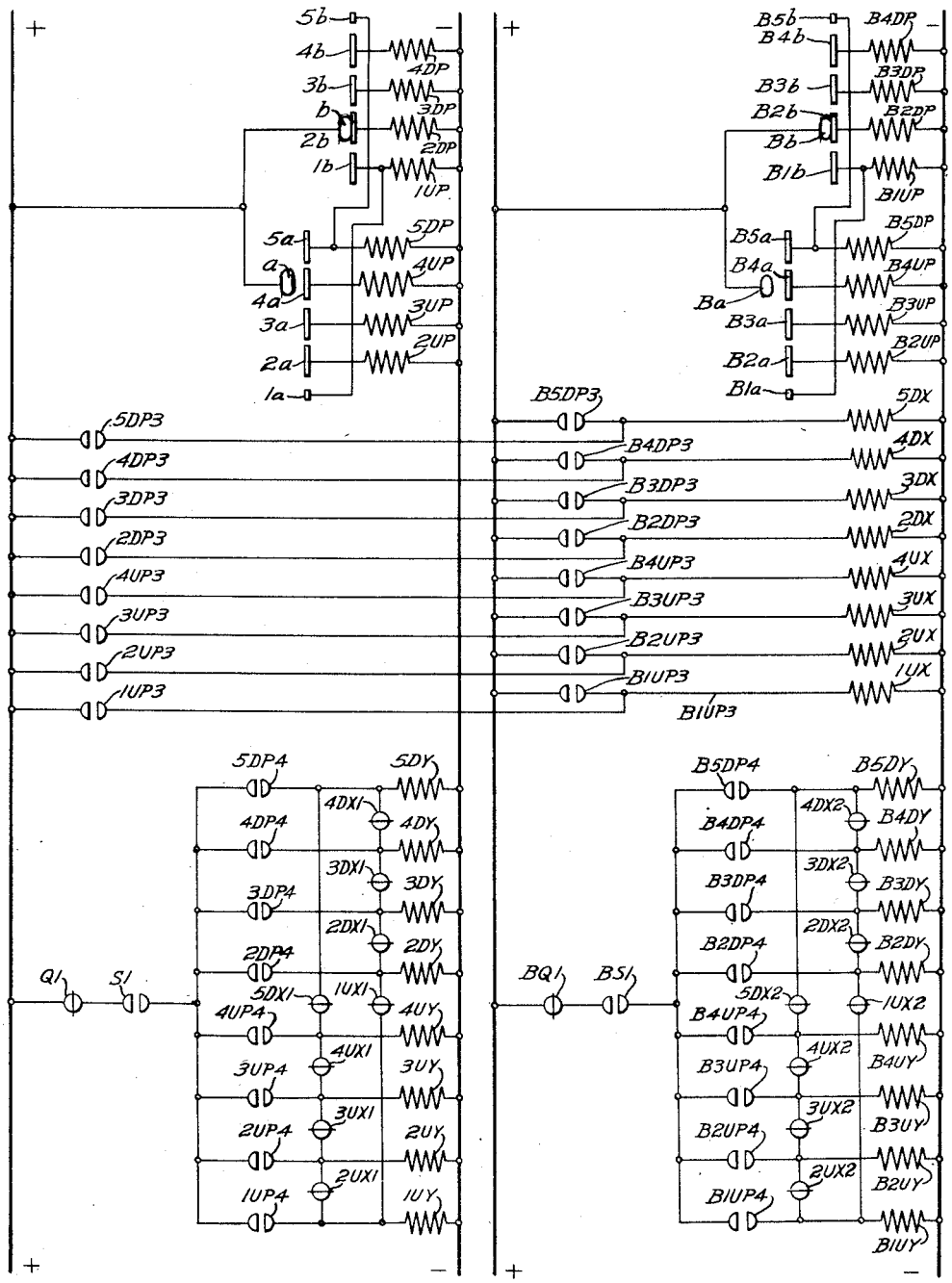
Figure 8:
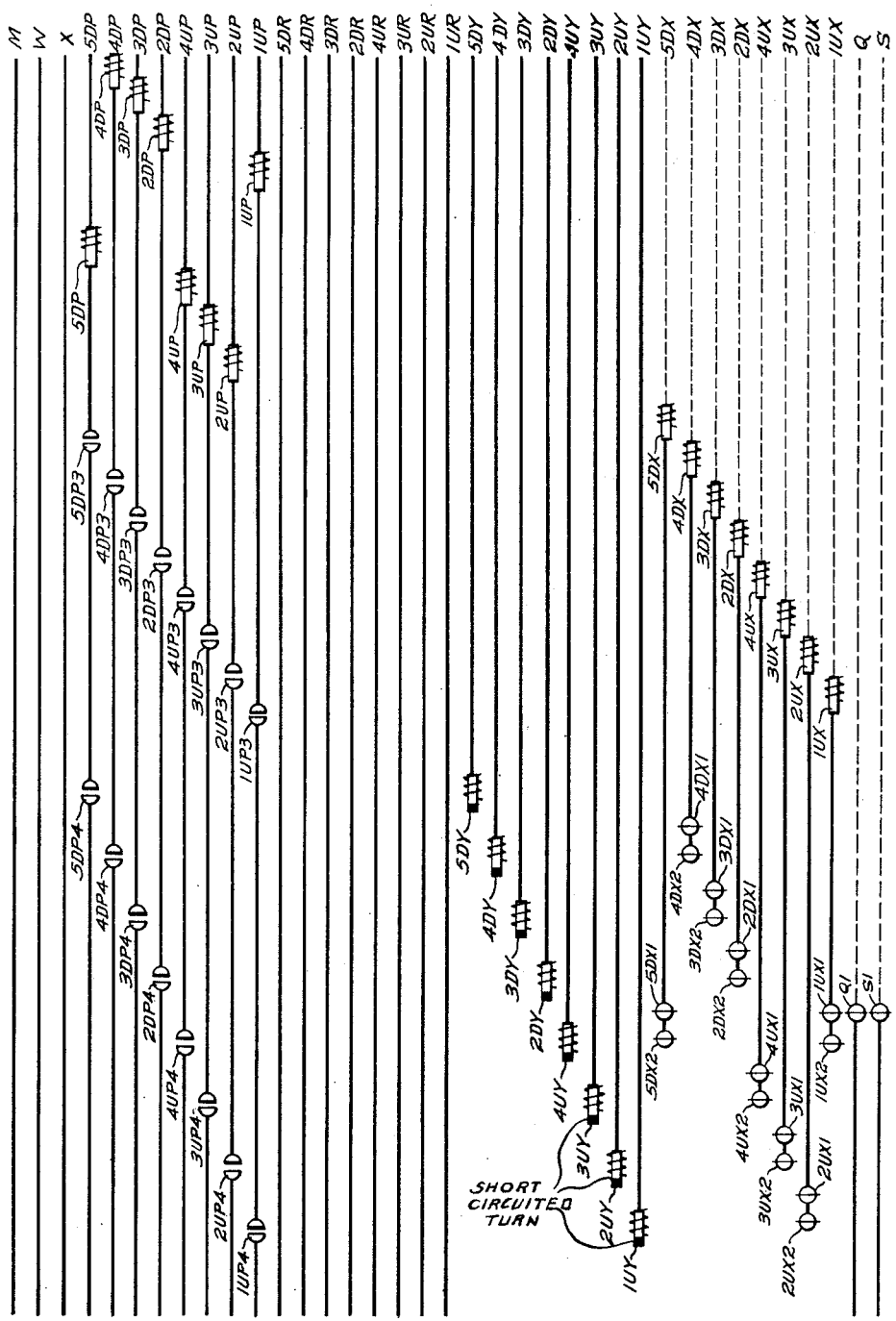
Figure 9:
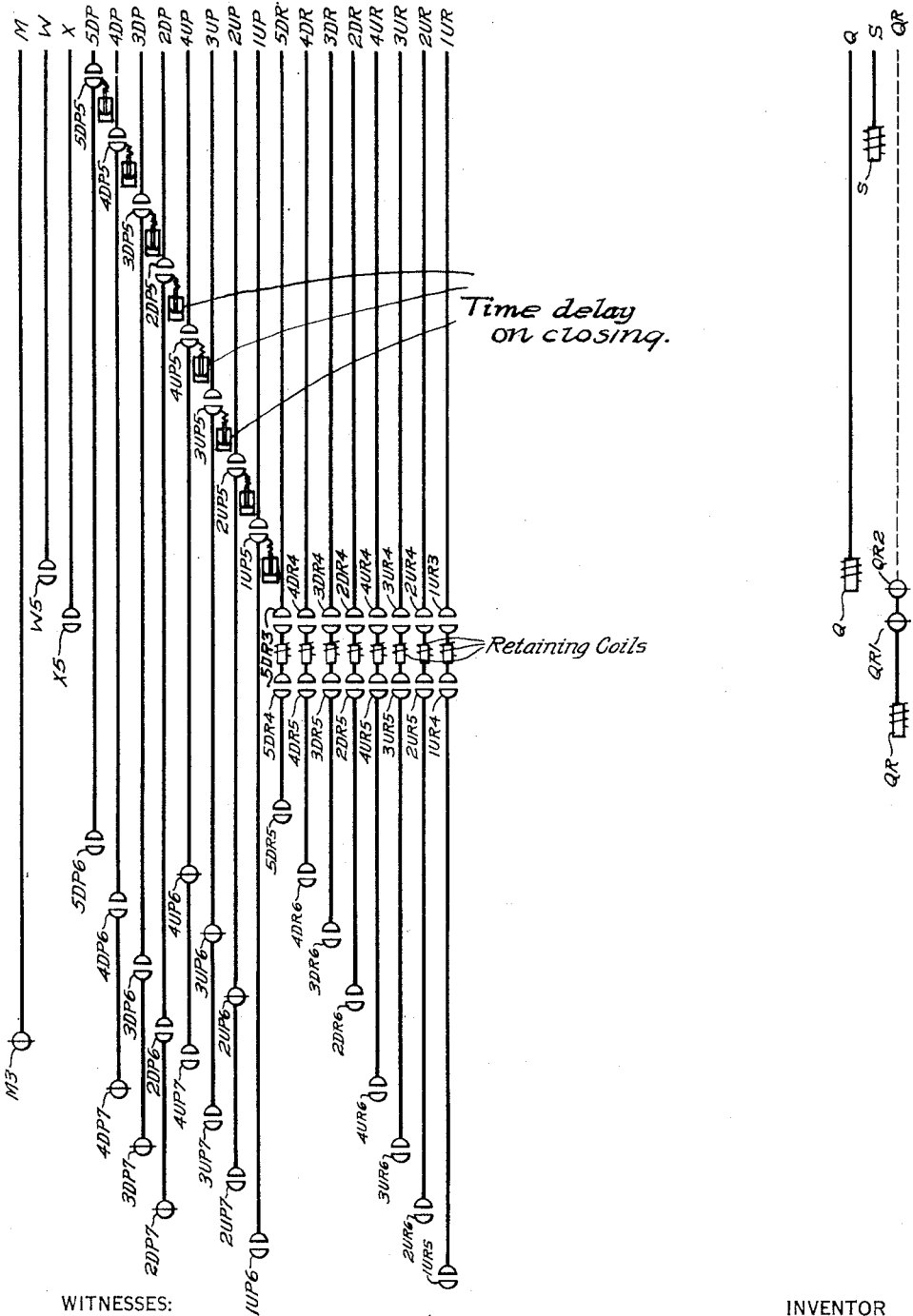

The circuits for the operating coils 5DY, 4DY, etc., associated with contacts 5DY1, 4DY1, etc., for car A, are shown in Fig. 4. Referring to Fig. 4, the up zoning relay coils, one of which is provided for each intermediate floor and the lower terminal floor are designated 1UY, 2UY, 3UY and 4UY, and the down zoning relay coils, one of which is provided for each intermediate floor and the upper terminal floor are designated 2DY, 3DY, 4DY and 5DY. The construction of the zoning relays is such that there is a slight time delay in their drop-out to prevent fluttering of these relays on successive energization and deenergization of the selecting relays S and BS. This time-delay may be provided by using a short circuited turn around the armature, as illustrated in Fig. 8 of the drawings. Other cars of the bank are similarly provided, the corresponding circuits for car B being shown at the right side of Fig. 4.

The individual zoning relays respond to a series of common zoning relays, also shown in Fig. 4, of which there is one up relay for each intermediate floor and the lower terminal floor, and a down relay for each intermediate floor and the upper terminal floor. The up common zoning relays are designated 1UX, 2UX, 3UX and 4UX, and the down common zoning relays are designated 2DX, 3DX, 4DX and 5DX. The common zoning relays respond directly to the positions of the respective cars of the bank, as illustrated by the parallel connected contacts of car position relays of both cars A and B in the circuits thereof.

Figure 5:
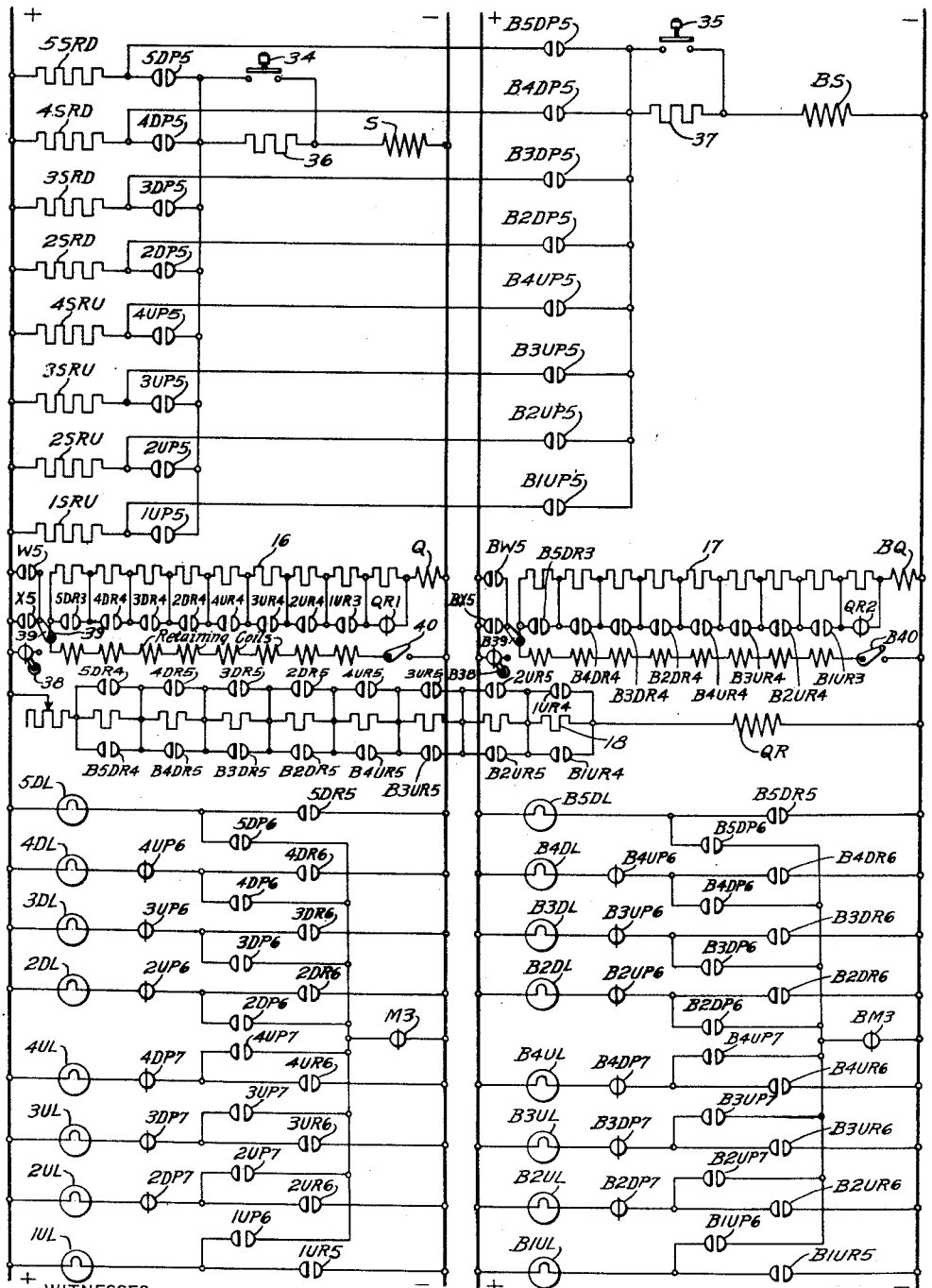
Figure 6:
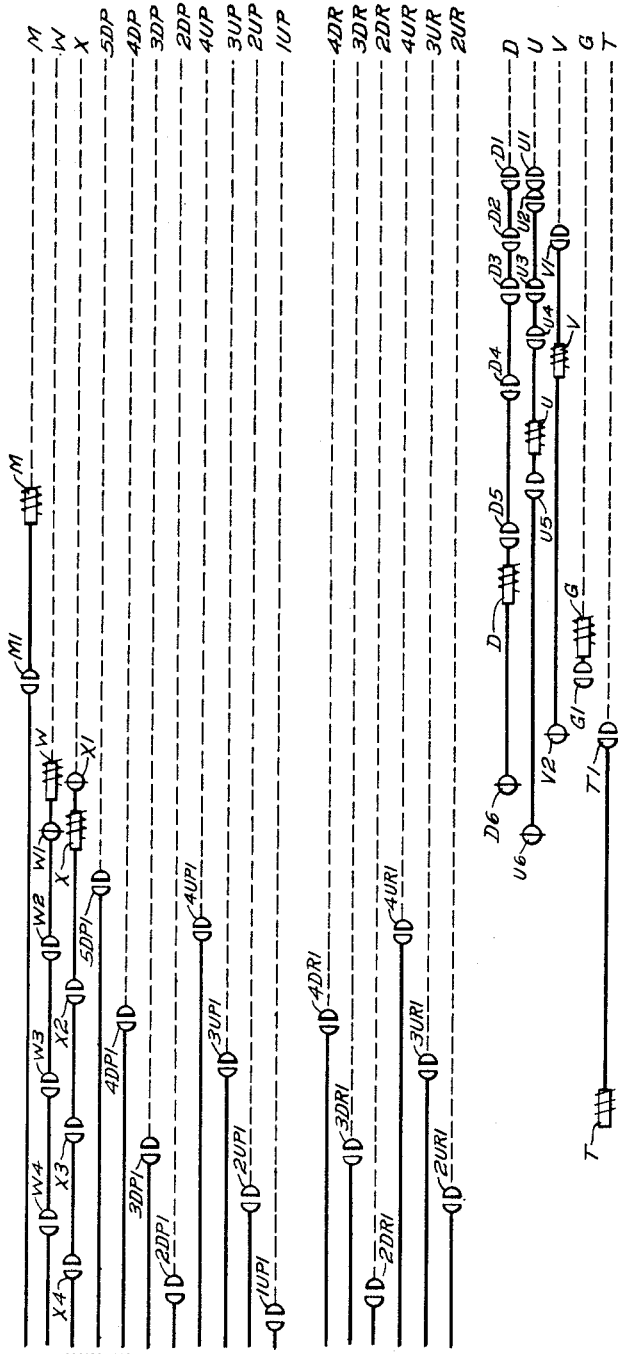
Figure 7:
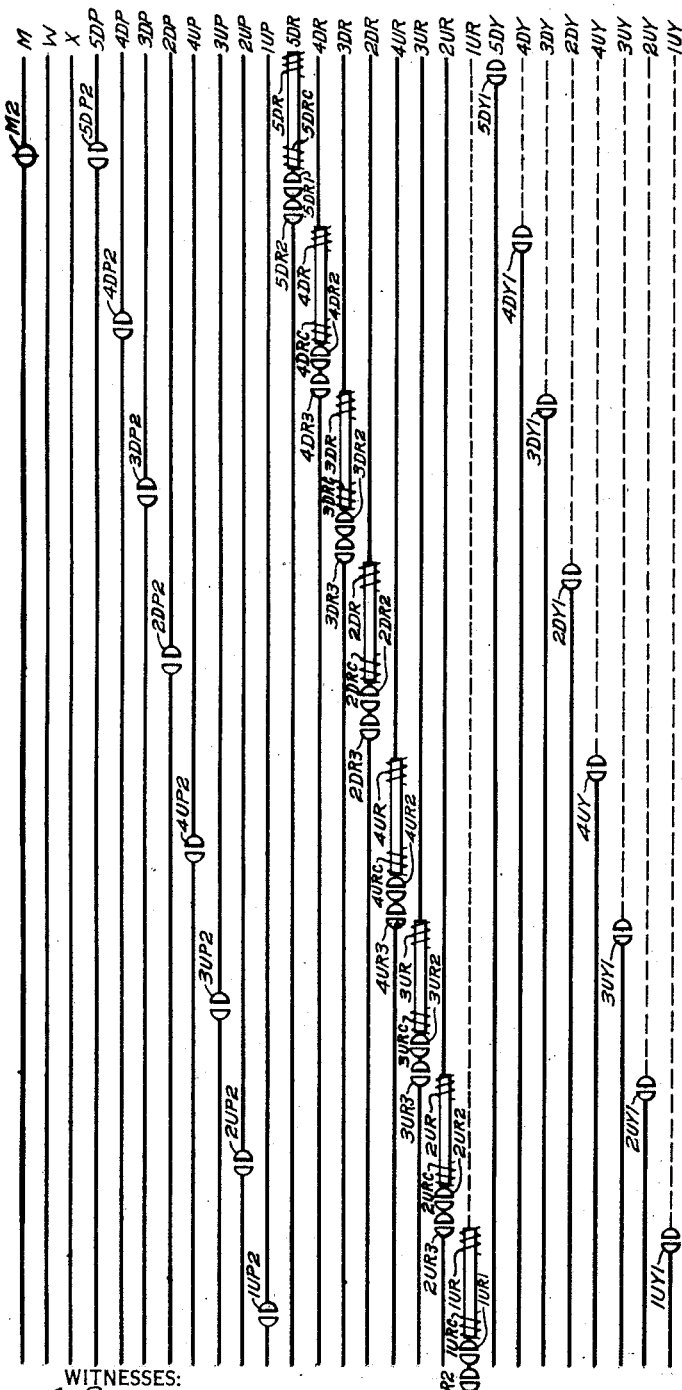

Referring to Fig. 5, the quota relay coils Q and BQ are connected for energization through resistors 16 and 17, parts of each of which may be short-circuited by contacts 5DR3, 4DR4, etc., associated with the floor relays for the corresponding car. As is described hereinafter, appropriation of a call to any particular car results in operation of a corresponding floor relay. The resistors 16 and 17 accordingly are so related to the value of current required to operate the quota relays Q and BQ that an operation thereof is caused upon closure of the number of floor relay contacts which represents the predetermined quota of calls. As also shown in Fig. 5, the quota relays are arranged to be reset each time the corresponding car reverses its direction of travel, by means of contacts W5 and X5, and BW5 and BX5, associated with the direction-determining relays for cars A and B, respectively.

Preferably also, the quota of each car is arranged to be automatically adjustable in accordance with varying traffic requirements. As illustrated in Fig. 5, a quota varying relay QR, common to all the cars of the bank, is provided for this purpose. Resistor 18 connected in series with relay QR, is subject to control by contacts on all of the floor relays associated with all of the cars in the bank. The excitation of relay QR accordingly is a measure of the number of unanswered calls at any given time. At a predetermined value of excitation relay QR operates, and by means of contacts QR1 and QR2, associated with the circuits for relays Q and BQ, respectively, varies the number of calls required to operate these relays. Only a single step of such automatic adjustment has been illustrated but such adjustment may of course be provided in a plurality of separate steps.

Referring further to Fig. 5, the car selecting relays S and BS shown at the top of the diagram are provided to supplement the action of the common zoning relays under conditions where two or more cars are standing at the same floor. Relays S and BS respond directly to the positions of the corresponding cars, through contacts 5DP5, 4DP5, etc., associated with the car position relays. Both relays S and BS are connected in parallel branches of a circuit having a common portion which includes a selective resistor 5SRD, 4SRU, etc. The arrangement is such that the selecting relays normally are energized, but are momentarily deenergized as the car passes transfer points between floors. The values of the selective resistors are such that if two or more selecting relay circuits corresponding as to floor, are simultaneously completed, none of the selecting relays operate, or if one or more additional selecting relay circuits are completed corresponding to a floor for which a selecting relay circuit is already complete, such additional selecting relays do not operate. The selecting relay associated with the already complete circuit remains in the operated position, however. A manually operable dispatcher's button is associated with each selecting relay, for operation in the event that two or more cars are standing at the same landing with none of the selecting relays in operated condition. Operation of a dispatcher's button short-circuits a corresponding section of resistance and causes operation of the selecting relay for that car.

As also shown in Fig. 5, each car of the bank is provided with a set of floor lanterns individual to it, there being an up floor lantern for each of the intermediate floors, and the lower terminal floor, and a down floor lantern for each of the intermediate floors and the upper terminal floor. The floor lanterns for car A are designated 1UL, 2DL, etc., and the lanterns for car B are similarly designated but have a prefix B. Each floor lantern is arranged to be illuminated through either of two circuits, one of which is controlled by a corresponding floor relay contact for the same floor, and the other of which is arranged to be controlled by a car position relay contact for the same floor and a contact on auxiliary control relay M. The former circuit causes the lighting of a floor lantern to occur as soon as a particular floor call is appropriated to one of the cars. The latter circuit causes a floor lantern to light at the time the car stops at the corresponding floor, in response, for example, to a call registered on one of its own car buttons.

The circuits for controlling the previously mentioned car position relays are shown in Fig. 4, car A being provided with an up car position relay for each intermediate floor, and the lower terminal floor, designated 1UP, 2UP, etc., and a down car position relay for each intermediate floor and the upper terminal floor, designated 2DP, 3DP, etc. Car B is similarly provided.

The car position relays for each car are caused to respond directly to the position and direction of movement of the associated car by means of a floor selector, which may be of any conventional type. As illustrated in Fig. 1, each floor selector 20 comprises a stationary panel 21, to which are attached a row of up segments and a row of down segments. The up row includes one segment for each intermediate floor and the upper terminal floor designated respectively 2a, 3a, 4a and 5a, and an auxiliary segment 1a for the lower terminal floor. The down row includes one segment for each intermediate floor and the lower terminal floor designated 1b, 2b, 3b and 4b, and an auxiliary segment 5b for the upper terminal floor. Floor selector 20 also comprises a screw-driven cross-head 22, which carries brushes a and b for cooperation with the up and down rows of segments, respectively. Cross-head 22 is reciprocated by screw 23 and is also mounted for a limited amount of rotation with it. With this latter arrangement, during upward travel of the car, the cross-head brush a engages its associated up segments but brush b does not engage its associated down segments, and, during downward movement, brush b engages its associated down segments, and brush a does not engage its associated up segments. Brushes a and b are preferably spring mounted, so that, upon a reversal of direction, a segment in the row corresponding to the reverse direction of travel is engaged just before a segment in the other row is disengaged. Shaft 24 and a suitable reducing gear unit 25 are arranged to rotate screw 23 in response to movement of the elevator car.

The spacing of the segments is such that a brush engages a segment for a particular floor just after the car leaves the preceding floor, and remains in engagement therewith until the car has moved a similar distance past the particular floor. The brush dimensions are such that a segment for one floor is engaged just before the segment for a preceding floor is disengaged, the period during which two segments are engaged being preferably just long enough to permit the succeeding relay to assume the energized position before the preceding relay assumes the deenergized position.

*Description of operation*

For convenience in the following description, the various relays and switches individual to car A and those common to all cars of the bank are identified as follows: As previously mentioned, the control system for cars A and B are identical, and the relays and switches individual to car B are given a distinguishing prefix B.

Individual to car A

- U — Up reversing switch
- D — Down reversing switch
- V — Speed switch
- E — Slowdown inductor switch
- F — Stopping inductor switch
- M — Auxiliary control relay
- G — Holding relay
- T — Stopping relay
- W — Up direction relay
- X — Down direction relay
- MSU — Up master switch contacts
- MSD — Down master switch contacts
- Q — Quota relay
- S — Selecting relay
- 1UP, 2UP, 3UP, 4UP — Up car position relays
- 2DP, 3DP, 4DP, 5DP — Down car position relays
- 1UR, 2UR, 3UR, 4UR — Up floor relays
- 2DR, 3DR, 4DR, 5DR — Down floor relays
- 1UY, 2UY, 3UY, 4UY — Up zoning relays
- 2DY, 3DY, 4DY, 5DY — Down zoning relays
- 2C, 3C, 4C — Car buttons

Common to all cars

- 1UF, 2UF, 3UF, 4UF — Up hall buttons
- 2DF, 3DF, 4DF, 5DF — Down hall buttons
- 1UX, 2UX, 3UX, 4UX — Up common zoning relay
- 2DX, 3DX, 4DX, 5DX — Down common zoning relays
- QR — Quota varying relay.

The operations involved in starting either car and the response thereto to the associated car buttons is as follows. Referring particularly to the control system for car A, Fig. 2, with the car standing at an intermediate floor, either up direction relay W or down direction relay X, and a corresponding car position relay are energized, depending upon the direction from which the car approached such intermediate floor. Certain of the zoning relays are also energized under such conditions, the operation of which is described later.

Assuming that the car is standing at the second floor and that it approached such floor traveling upwardly, up direction relay W (Fig. 2) is energized, the circuit therefor including contacts D6 of the down reversing switch, which are now closed since the car is at rest, and interlock contacts X1 of the down direction relay, which are now closed. Up direction relay W being energized, its contacts W1 are open, and its contacts W2, W3, W4 and W5 are closed. Contacts W1, Fig. 2, prevent energization of the coil of down direction relay X. Contacts W2, W3 and W4, Fig. 2, connect car buttons 4C, 3C and 2C, respectively, to contacts on the up car position relays in preparation for up direction travel. Contacts W5 are associated with the quota relay circuits in Fig. 5, the operation of which is described later.

With the car standing at the second floor and having approached such floor traveling upwardly, up second floor car position relay 2UP (Fig. 4) is energized, since brush a is in engagement with segment 2a. Up car position relay 2UP being operated, its contacts 2UP1, 2UP2, 2UP3, 2UP4, 2UP5 and 2UP7 are closed, and its contacts 2UP6 are open. Contacts 2UP1 prepare a circuit for stopping relay T in Fig. 2. Contacts 2UP2, 2UP3, 2UP4, and 2UP5 are concerned with the response to hall calls, described later. Contacts 2UP7, in Fig. 5, complete a circuit for the up second floor lantern 2UL, the lighting of which informs any intending passenger that car A is at the second floor conditioned to travel upwardly. The circuit for up lantern 2UL also includes contacts M3, which are closed, since the car is at rest, and contacts 2DP7 associated with the down car position relay, which are closed at this time. The opening of contacts 2UP6 prevents completion of a circuit for down second floor lantern 2DL, in Fig. 5, to meet an operating condition described later in connection with the response to hall calls.

Starting operations

To start the car upwardly, up master switch contacts MSU, (Fig. 2) may be closed to thereby complete a circuit for the coil of up reversing switch U and the coil of auxiliary control relay M. This circuit is controlled by contacts 26 on the elevator car gate, as well as by contacts on the hatchway doors, which, for convenience, have been illustrated as represented by a single contact 27. The car accordingly cannot be started unless the gate and all doors are closed. This circuit also includes up contacts F1 of stopping inductor switch F, which are now closed.

Up reversing switch U upon operation closes contacts U1, U2, U3, U4 and U5, and opens contacts U6 all of which are shown in Fig. 2. Contacts U1 and U3 complete a circuit for field winding 13 of generator 11, which includes resistor 30. Upon completion of this circuit, generator 11 applies a relatively low voltage to the armature of motor 10, of proper polarity to cause motor 10 to move the elevator car upwardly at low speed. Contacts U2 complete a circuit for the release coil of the electromagnetic brake 14, which accordingly releases, permitting motor 10 to start upwardly at low speed. Contacts U4 complete a circuit for the coil of speed switch V which also includes now closed up contacts E1 of slowdown inductor switch E. Switch V accordingly operates closing contact V1, in parallel with resistor 30, and opening contacts V2 in the circuit of stopping inductor switch coil F. The latter operation has no effect at this time, but the short circuiting of resistor 30 increases the excitation of field winding 13 and causes motor 10 to accelerate to full speed. Contacts U5 complete a self-holding circuit for reversing switch coil U, so that up master switch contacts MSU may be opened without effect. The opening of contacts U6 has no effect, since, as previously mentioned, up direction relay contacts W1 are also open at this time.

In Fig. 2, the completion of the reversing circuit for generator field winding 13, the release of brake 14, and the closure of accelerating contacts V1 are illustrated as occurring substantially simultaneously. It will be understood that in practice these operations occur sequentially.

Upon operation, auxiliary control relay M closes contacts M1 and opens contacts M2 and M3. Contacts M1 (Fig. 2) prepare the circuits for inductor switch coils E and F. Contacts M2 (Fig. 3) are concerned with the response to hall calls described later. The opening of contacts M3 (Fig. 5) interrupts the previously described circuit for the second floor up lantern 2UL, extinguishing this signal.

Response to car buttons

Upon completion of the above-described circuits, car A continues to travel upwardly until it approaches a floor for which a call is registered. Shortly after car A leaves the second floor, brush *a* of the floor selector engages segment 3*a*, completing a circuit for up car position relay 3UP, and shortly thereafter disengages segment 2*a*, interrupting the previously described circuit for up car position relay 2UP.

Relay 3UP upon operation closes contacts 3UP1, 3UP2, 3UP3, 3UP4, 3UP5 and 3UP7 and opens contacts 3UP6. These contacts have the same effect as the corresponding contacts of up car position relay 2UP, with the exception that closure of contacts 3UP7 does not complete the associated floor lantern circuit shown in Fig. 5, since contacts M3 are now open.

If no car call or hall call is registered for the third floor, car A moves upwardly past this floor without stopping. If, however, third floor car button 3C is closed at any time prior to the arrival of the car at the slowdown point for the third floor, the car is caused to stop in response thereto. The car buttons are arranged to be manually closed and preferably are retained in the closed position by retaining coils associated therewith, and which, while ineffective to move the corresponding button to the closed position, are effective to maintain it in that position after manual closure. The retaining coils for the car buttons are shown at the bottom of Fig. 2, and designated "car button coils".

Assuming car button 3C is closed, the contacts thereof, in conjunction with contacts W3 and 3UP1 cause completion of a circuit for the coil of stopping relay T. Stopping relay T upon operation closes contacts T1, completing two parallel circuits in Fig. 2, for the coils of slowdown inductor switch E and holding relay G, contacts M1 being closed at this time. Relay G in turn closes contacts G1 completing a holding circuit for coils E and G.

As previously mentioned, the energization of coil E is without immediate effect. When, however, the up armature associated with slowdown inductor switch E is brought opposite a cooperating inductor plate UE, which occurs when the car reaches the slowdown point for the third floor, contacts E1 open (Fig. 2) deenergizing speed switch V.

Speed switch V accordingly reopens contacts V1 to reinclude resistor 30 in the circuit of generator field winding 13, initiating the slowdown; and closes contacts V2 to complete the circuit for the coil of stopping inductor switch F.

As car A, now traveling at reduced speed, reaches a point slightly in advance of the third floor, the up armature associated with inductor switch F is brought opposite a cooperating inductor plate UF and contact members F1 are opened, interrupting the previously described circuit for up reversing switch and auxiliary control relay M.

Up reversing switch U accordingly opens its contacts U1, U2, U3, U4 and U5 and recloses contacts U6. The opening of contacts U1, U3 and U2 interrupts the circuit for field winding 13, and the coil of brake 14, respectively, bringing the car to rest at the third floor. The opening of contacts U4 and U5 has no effect in view of the previous operation of inductor switch contacts E1 and F1. The reclosure of contacts U6 has no effect, since contacts W1 are still open.

Upon interruption of the circuit for the coil thereof, auxiliary control relay M opens contacts M1 and recloses contacts M2 and M3. The opening of contacts M1 in Fig. 2 deenergizes the coils of inductor switches E and F and holding relay G, in response to which contacts G1 reopen without effect, and contacts E1 and F1 of the inductor switches reclose without effect. Contacts M2 are concerned with the resetting of operated floor relays, later described. Closure of contacts M3 in Fig. 5 completes the circuit for up floor lantern 3UL, since, as previously mentioned, car position relay contacts 3UP7 and 3DP7 are now closed. It will be noted that this latter circuit remains complete as long as the car remains at the third floor, conditioned to travel upwardly.

The car may again be started upwardly in the manner previously described. As an incident to the departure of the car from the third floor, up lantern 3UL in Fig. 5 is extinguished by the opening of contacts M3. The car may also be stopped at the fourth floor in response to closure of the fourth floor button 4C, which is arranged to complete a circuit for stopping relay T through contacts of the up fourth floor position relay 4UP1. Upon operation of relay T, the stopping operation is as previously described.

In the illustrated embodiment, the fifth floor is considered the upper terminal floor and a stop at that floor is accomplished in the manner previously described with the exception that the fifth floor circuit for relay T is completed directly by closure of car position contacts 5DP7 which occurs, as previously mentioned, just after the car leaves the fourth floor traveling upwardly. As an incident to the stopping operation at the fifth floor also, contacts M3 complete a circuit for the down fifth floor lantern 5DL, which includes car position relay contacts 5DP6.

In the course of the slowdown operation for the fifth floor also, limit switch 31 is momentarily opened, deenergizing the car button retaining coils, Fig. 2, and releasing any operated car buttons. Limit switch 31, and a corresponding switch 32 for the lower terminal are preferably incorporated into the floor selector and are arranged to be momentarily operated when the car approaches the associated terminal but not when it leaves such terminal. A manual reset button 33 is provided for operation in the event the car is reversed at an intermediate floor.

The car may be started downwardly from the fifth floor by the closure of down master switch contacts MSD, the starting and accelerating operation being as previously described with the exception that reversing switch D operates instead of reversing switch U, contacts D1 and D3 of which reverse the excitation of generator G and cause downward operation of motor 10. Contacts D2 release brake 14, contacts D4 operate speed switch V, and contacts D5 complete a holding circuit for coils D and M.

The opening of contacts D6 interrupts the previously described circuit in Fig. 2 for up direction relay W, contacts W1 of which reclose completing a circuit for down direction relay X and contacts W2, W3, W4 and W5 of which reopen. The opening of contacts W2, W3, and W4 has no effect at this time. The opening of contacts W5 is concerned with the operation of quota relay Q, later described.

Upon operation, down direction relay X opens contacts X1 preventing completion of a circuit for up direction relay W, and closes contacts X2, X3, X4 and X5. Contacts X2, X3 and X4 prepare circuits in Fig. 2 to enable the stopping of the car during down travel in response to the car buttons. Contacts X5 are concerned with quota relay Q, the operation of which is later described.

In the course of the starting operation from the fifth floor contacts M3 open, extinguishing the fifth floor down lantern 5DL.

As the car starts from the fifth floor traveling downwardly also, floor selector brush carriage 22 rotates slightly with screw 23, shown in Fig. 1, first moving brush $b$ into engagement with segment 5$b$, and then moving brush $a$ out of engagement with segment 5$a$. Segments 5$a$ and 5$b$ are cross connected so that the circuit for relay 5DP is maintained during the throwover operation. Shortly thereafter brush $b$ engages segment 4$b$ and moves out of engagement with segment 5$b$.

The engagement of brush $b$ with segment 4$b$ completes a circuit in Fig. 4 for down fourth floor car position relay 4DP, contact members 4DP1, 4DP2, 4DP3, 4DP4, 4DP5 and 4DP6 of which close and contacts 4DP7 of which open. Closure of contacts 4DP1, Fig. 2, prepares a circuit for stopping relay T. Contacts 4DP2, 4DP3, 4DP4 and 4DP5 are concerned with the response to hall calls, described later. Contacts 4DP6 prepare a circuit for down fourth floor lantern 4DL which is not completed, however, since contacts M3 are now open. The opening of contacts 4DP7, also in Fig. 5, prevents completion of a circuit for up fourth floor lantern 4UL, for reasons explained later.

As car A moves downwardly, the down car position relays for the various floors are successively operated in the manner described for the up car position relays during up car travel, each of the down car position relays functioning as just described for fourth floor down car position relay 4DP.

During its downward movement, car A may be stopped successively at floors in response to operated car buttons, the circuit for stopping relay T (Fig. 2) in each case including the corresponding car button contacts, contacts on down direction relay X for the corresponding floor, and contacts of the down car position relay for the corresponding floor. Upon operation of stopping relay T the slow down and stopping operations are the same as described for up direction travel with the exception that down contacts E2 and F2 of inductor switches E and F operate as the car passes corresponding down inductor plates DE and DF. In the course of each stopping operation also the corresponding floor lantern 4DL, 3DL, 2DL, etc. is lighted by the closure of contacts M3 in Fig. 5, and remains lighted until the car leaves the corresponding floor.

In the course of the stopping operation at the first floor, any operated car buttons are reset by the momentary opening of limit switch 32.

As thus far described, it is seen that car A may be started upwardly or downwardly by momentary operation of the associated master switch MS, and may be stopped successively in its upward or downward travel at floors for which car buttons are operated, regardless of the order of operation of such car buttons. All operated car buttons are reset automatically at terminal landings, and may be reset manually at any point. As an incident to each stopping operation, the floor lantern for the corresponding direction of travel is lighted and remains lighted until the car leaves the floor.

Since the control systems for cars A and B are identical, the performance of car B is the same as the above described performance of car A.

*Zoning and selecting relay operation*

As previously mentioned, registered hall calls are appropriated to a particular car at the time they are registered, the car to which a call is appropriated being determined by the zoning and selecting relays, the operation of which is subject to control by the quota mechanism. Referring particularly to Figs. 4 and 5, the operation of the car selecting and zoning relays is as follows:

Assuming both cars A and B are standing at the first floor, first floor up car position relay 1UP for car A is energized, as previously described, and the corresponding first floor up car position relay B1UP for car B is also energized through a similar circuit. Contacts 1UP5 of car position relay 1UP complete a circuit in Fig. 5 for selecting relay S associated with car A, and contacts B1UP5 complete a corresponding circuit for selecting relay BS associated with car B. These circuits have a common portion which includes selective resistor 1SRU the value of which, as previously mentioned, is such that when more than one of the two parallel branches are complete, the voltage available to the selecting relays is insufficient to actuate them. If, however, only one of the two parallel branches is complete, the selecting relay included in that branch is actuated and remains so even though an additional branch or branches are subsequently completed.

In the operation of the system, several conditions may arise under which more than one car may be standing at the same floor with none of the selecting relays operated. For example, it is usual for cars of a bank to remain at a common floor while the bank is out of service. Upon being again placed in service, the selective resistor for the corresponding floor would prevent operation of the selecting relay for each car at such floor. Also in the application of the present invention to banks of more than two cars, a first car may arrive, operate its associated selecting relay, and prior to the departure thereof from its floor, two or more other cars may arrive at the same floor. Under such conditions, the selecting relays for such other cars would not be operated.

The dispatchers' buttons 34 and 35 in Fig. 5 provide a manual means for selecting between the cars in the event two or more of such cars are standing at the same floor with none of the selecting relays operated. Each button 34 and 35 is arranged to short circuit a section of resistance 36 or 37 in series with the corresponding selecting relay coil and cause operation of that relay.

Assuming that switch 34 in Fig. 5 is operated, selecting relay S associated with car A is energized and closes its contact S1 to prepare the circuits for the zoning relays individual to car A. If car A is started upwardly, the up car position relays associated therewith successively operate as previously described.

Contacts 1UP5, 2UP5, etc., of the car position relays are provided with timing mechanism to delay the closing movements thereof after energization of the associated coil. This interval is preferably just slightly in excess of the period that the circuits for two consecutive car position relay coils are complete. With this arrangement, during up travel contacts 1UP5 open before contacts 2UP5 close, etc., and corresponding action occurs during down travel. The arrangement for car B is the same. Accordingly, there is a short interval at each transfer point throughout which selecting relay S is deenergized. At the completion of each transfer, however, selecting relay S is again energized and remains so until car A reaches the next transfer point. If car A is moved downwardly, the same intermittent operation of relay S is caused by the successive operation of the down car position relays.

As soon as car A leaves the first floor and deenergizes its car position relay 1UP, contacts 1UP5 open in Fig. 5. This causes an increase in the excitation of the coil of selecting relay BS associated with car B, which consequently operates, closing its contacts BS1 in Fig. 4, and preparing the zoning relay circuits of car B. During upward and downward travel of car B relay BS functions in manner just described for relay S.

If car A returns to the first floor while car B is still standing at that floor, reclosure of contact members 1UP5 on the first floor car position relay for car A again completes the circuit for selecting relay S, but operation thereof is prevented by the selective resistor 1SRU for the first floor, as previously described. Similarly, if either car A or car B arrives at any other floor, at which another car is already standing, operation of the selecting relay for such second car is prevented by the selective resistor for the corresponding floor.

Contact members 1UP3, 2UP3, etc. of the car position relays for car A are connected directly in parallel with corresponding contact members on the car position relays associated with all other cars in the bank, in this case with car B, and control the circuits for the common zoning relays. With this arrangement, as car A moves upwardly, it successively operates the common zoning relays, the circuit for one common zoning relay being completed just prior to interruption of the circuit for a preceding zoning relay. Corresponding operation of the down zoning relays is effected by car A during downward travel. Corresponding operation of these relays is also caused by up and down travel of car B.

Each common zoning relay is provided with a contact for each car in the bank. Zoning relay contacts 1UX1, 2UX1, 3UX1, etc. in conjunction with contacts 1UP4, 2UP4, etc. on the car position relays for car A, control the zoning relays for car A. Zoning relay contacts 1UX2, 2UX2, etc. in conjunction with contacts B1UP4, B2UP4, etc. on the car position relays individual to car B, control the zoning relays for car B.

Assuming again that both cars A and B are standing at the first floor, contacts 1UP4, on the first floor car position relay for car A are closed, and corresponding contacts B1UP4 for car B are closed. The latter contacts are without effect, however, if it is again assumed that selecting relay BS for car B is not operated and that contacts BS1 thereof are open. If, as in the previous example, selecting relay S for car A is caused to operate, contacts S1 thereof close, completing a circuit for all of the individual zoning relays 1UY, 2UY, 3UY, 4UY, 2DY, 3DY, 4DY, and 5DY with car A. The circuit for relay 1UY includes contacts S1 and 1UP4. The circuit for relay 2UY includes an additional common zoning relay contact 2UX1. The circuit for relay 3UY includes a further zoning relay contact 3UX1 and the circuits for the remaining individual zoning relays include further contacts on the common zoning relays.

As later described, operation of any individual zoning relay causes any hall call for the corresponding floor and direction to be appropriated to the car associated with the operated individual zoning relay. With both cars A and B at the first floor, therefore, and A the selected car, any up or down hall call registered at any floor of the building is appropriated to car A.

As car A leaves the first floor, second floor up car position relay 2UP is energized and shortly thereafter first floor car position relay 1UP is deenergized. Selecting relay S is momentarily deenergized during this transfer period, through the sequential operation of contacts 1UP5 and 2UP5. The opening of contacts 1UP3 is without effect since parallel connected contacts B1UP3 for car B are still closed. Closure of contacts 2UP3 completes a circuit for second floor up common zoning relay 2UX, contact members 2UX1 and 2UX2 of which open. The opening of contacts 2UX1 in conjunction with the opening of contacts 1UP4 deenergizes first floor individual zoning relay 1UY for car A, excluding first floor up calls from the zone for car A. The opening of contacts 2UX2, in conjunction with already open contacts 1UX2 of the first floor common zoning relay, prevents completion of any individual zoning relay circuits for car B, except that for first floor up relay B1UY.

Closure of contacts 2UP4 which, as described, occurs before the opening of contacts 1UP4, maintains the initially described circuit for individual zoning relays 2UY, 3UY, 4UY, 2DY, 3DY, 4DY and 5DY. The opening of contacts 1UP5, as car A leaves the first floor, causes operation of selecting relay BS for car B, as previously described, and contacts BS1 accordingly close. Contacts BS complete a circuit for first floor up individual zoning relay B1UY for car B, which circuit also includes contacts B1UP3 of the first floor car position relay for car B.

At the termination of this particular transfer operation, accordingly, selecting relays S and BS are both operated; common zoning relay 2UX is operated by car A; common zoning relay 1UX is operated by car B; up second floor car position relay 2UP is operated by car A and up first floor car position relay B1UP is operated by car B. As a consequence of the departure of car A from the first floor, therefore, first floor up calls are excluded from the zone of car A by the deenergization of relay 1UY and such calls are placed in the zone for car B by the energization of relay B1UY.

As car A continues upwardly and reaches a point just above the second floor, up third floor car position relay 3UP is operated and thereafter up second floor car position relay 2UP is deenergized. This transfer operation results again in a momentary deenergization of selecting relay S, and in the sequential energization and deenergization of common zoning relays 3UX and 2UX, respectively. Contacts 3UX1 and 2UP4 deenergize second floor up individual zoning relay 2UY, excluding up second floor calls from the zone of car A. The reclosure of contacts 2UX2 energizes up second floor individual zoning relay B2UY, including up second floor calls in the zone for car B. Closure of contacts 3UP4 maintains the initial circuit for individual zoning relays 3UY, 4UY, 3DY, 4DY and 5DY.

At the termination of the transfer operation occasioned by the departure of car A upwardly from the second floor, selecting relays S and BS are both operated; common zoning relay 3UX is operated by car A; common zoning relay 1UX is operated by car B; up third floor car position relay 3UP is operated by car A and first floor up car position relay B1UP is operated by car B; individual zoning relays 3UY, 4UY, 2DY, 3DY, 4DY and 5DY for car A are operated and individual car zoning relays B1UY, B2UY are operated. The zone for car A now includes both up and down calls for all floors of the building, except up calls at the first and second floors, and the zone for car B includes up calls for the first and second floors.

As car A passes the next transfer point traveling upwardly, that just above the third floor, an operation in all respects similar to that described for the preceding transfer operation occurs at the termination of which fourth floor car position relay 4UP is energized instead of relay 3UP; up fourth floor common zoning relay 4UX is energized instead of relay 3UX; individual zoning relay 3UY for car A is deenergized and corresponding relay B3UY for car B is energized. Accordingly, the zone for car A now includes up and down calls for all floors, except up calls at the first, second and third floors, and the zone for car B includes up calls at the first, second and third floors.

It is believed obvious that a corresponding action occurs as car A leaves the fourth floor traveling upwardly, resulting in excluding up fourth floor calls from the zone for car A and including such calls in the zone for car B.

As car A starts downwardly from the upper terminal or fifth floor, fourth floor car position relay 4DP is energized, and shortly thereafter fifth floor car down position relay 5DP is deenergized. This operation excludes fifth floor calls from the zone of car A and includes such calls in the zone for car B. As car A moves downwardly, it is believed obvious that down calls are successively excluded from the zone of car A and included in the zone of car B. When car A starts downwardly from the second floor, the last call in the zone for car A is excluded and, with both cars again at the terminal floor, all up and down calls are included in the zone for car B since under these circumstances, selecting relay contacts S1 for car A will open.

In the previously described example of a round trip of car A, the up calls for car A were successively included in the zone for car B and then the down calls were successively transferred. In the event of a reversal of car A intermediate the terminal floors, all of the up calls for floors above car A, as well as the down calls for floors above car A, are simultaneously excluded from the zone for car A and included in the zone for car B. For example, if car A travels to the third floor and then starts downwardly, down car position relay 3DP is energized by the engagement of brush b and segment 3b, and up car position relay 3UP is deenergized when brush a is lifted out of engagement with segment 3a. When common zoning relay 3UX is deenerigezd, closure of contacts 1UX2 extends the zone for car B to floors above the second floor. When common zoning relay 3DX is operated, the opening of contacts 3DX2 excludes down calls for the third floor and floors below it from the zone of car B. The opening of contacts 3DX1 and contacts 1UX1, which are still open, limit the zone for car A to down calls for the third and second floors.

It is believed obvious that if car B starts upwardly from the first floor, while car A is standing at the first floor, calls will successively be excluded from the zone for car B and included in the zone for car A in the manner described for movements of car A.

It is also believed obvious that when both cars are at positions other than the terminal floor, the zone for either car includes all calls in advance of its position to the position of the next car. For example, assuming that car A is at the third floor conditioned to travel downwardly, and that car B is at the fourth floor conditioned to travel upwardly, selecting relays S and BS are operated; third floor down common zoning relay 3DX is operated by car A; up fourth floor common zoning relay 4UX is operated by car B; down third floor position relay 3DP is operated by car A; and up fourth floor car position relay B4UP is operated by car B. Closed contacts S1, 3DP4, 2DX1, 1UX1, 2UX1 and 3UX1 complete circuits for individual zoning relays 1UY, 2UY, 3UY, 2DY and 3DY, thereby including down calls for the third and second floors and up calls for the first, second and third floors in the zone for car A. Open contacts 3DX1 and 4UX1 prevent energization of zoning relays 4UY, 4DY and 5DY for car A excluding up calls for the fourth floor and down calls for the fifth and fourth floors from the zone of car A.

Similarly, contacts BS1, B4UP4, 5DX2 and 4DX2 complete circuits for individual zoning relays B4DY, B5DY and B4UY for car B, including corresponding calls in the zone for car B. Open contacts 3DX2 and 4UX2 exclude remaining calls from the zone of car B.

If at any time both cars arrive at the same floor, which may occur in the event that one car stops at such floor in response to a car call, and the other car stops at such floor in response to a hall call, the selecting relay for the first car to reach that floor is operated and the selecting relay for the second car is not operated, as previously described. Under these circumstances, the zone for the first car includes up and down calls for all floors of the building and the second car has no zone. As soon, however, as the cars again assume different positions in the hatchway, the selecting and zoning relays again establish zones therefor in the manner previously described.

If one of the cars passes another of the cars conditioned to travel in the same direction, the overtaking car transfers the floors previously in the zone of the overtaken car to its own zone, since the common zoning relays IUX, 2UX, etc., the contacts of which determine the limits of the zones, respond to the relative positions and directions of travel of all of the cars.

*Response to hall buttons*

Referring now particularly to Fig. 3 of the drawings, it is seen that closure of any hall button 5DF, 4DF, 3UF, 4UF, etc., prepares the circuit for the corresponding floor relays for each car of the bank, each branch floor relay circuit including a zoning relay individual to the corresponding car. Assuming, for example, that down button 3DF is operated at a time that third floor down calls are in the zone for car A, contacts 3DYI are closed and contacts B3DYI are open, as previously described. Contacts 3DYI complete a circuit for the coil of relay 3DR, which upon operation, closes a self-holding circuit for itself through contacts 3DR2 and prepares a resetting circuit for itself through contacts 3DR3. It will be noted that the just-mentioned self-holding circuit is independent of contacts 3DYI so that the third floor down call remains registered on car A even though, prior to the stopping of car A at the third floor during downward travel, third floor down calls may be excluded from the zone for car A and placed in the zone for car B.

Down third floor relay 3DR also closes contact members 3DRI in Fig. 2 and contact members 3DR4, 3DR5 and 3DR6 in Fig. 5. Contacts 3DRI prepare a circuit for stopping relay T, which upon the approach to the third floor of car A traveling downwardly, results in the stopping thereof at the third floor in the same manner as described for car calls.

Contacts 3DR4 and 3DR5 are concerned with the quota mechanism described later. Contacts 3DR6 complete a circuit for the third floor down lantern 3DL in Fig. 5, which informs the intending passenger at the time of registration of the call which car of the bank will respond.

As an incident to the stopping of the car, contact members M2 of auxiliary control relay M reclose, and under the conditions assumed, complete a circuit for the resetting coil 3DRC of the down third floor relay 3DR. This circuit includes contact members 3DP2. It is seen, therefore, that the resetting of the call is effected when the car to which it is appropriated stops at the corresponding floor. The resetting of the above-mentioned third floor down call causes the reopening of contacts 3DR6 in Fig. 5, but does not extinguish lantern 3DL, since at this time contacts 3DP6 and M3 are closed, maintaining an independent circuit for this lantern.

As appears from Fig. 3, calls may be registered at any time at all floors included in the zone for a particular car, and as appears from the previous description of the circuits, these calls are responded to in the natural order of the floors regardless of the order of registration of the calls. These calls also cause the lighting of the corresponding floor lanterns which may be extinguished at the time the corresponding car leaves the floor.

It frequently happens that the zone for a particular car may include both up and down calls for a particular floor. If both hall buttons for such a floor are operated, both floor lanterns for that floor are immediately lighted. For example, if both up and down calls for the third floor are in the zone for car A, operation of buttons 3UF, and 3DF actuates both relays 3UR and 3DR, contact members 3UR6 and 3DR6 of which immediately light lanterns 3UL and 3DL in Fig. 5.

If car A's next approach to the third floor is in the up direction, up third floor car position relay 3UP is operated as car A leaves the second floor. The opening of contact members 3UP6 in Fig. 5 interrupts the previously completed circuit for down third floor lantern 3DL, thereby informing the intending passengers that car A is conditioned to travel upwardly. As car A leaves the third floor traveling upwardly, third floor car position relay 3UP resumes the deenergized position and contacts 3UP6 reclose, relighting the third floor down lantern. As previously mentioned, the third floor up lantern is extinguished at starting by the opening of contacts M3. If, on the other hand, car A's first approach to the third floor is in the downward direction, contact members 3DP7 open as the car leaves the fourth floor traveling downwardly. This action extinguishes the third floor up lantern 3UL. As car A leaves the third floor traveling downwardly, lantern 3UL is relighted by the reclosure of contacts 3DP7.

As mentioned, it may happen that one car stops at a floor for which an unanswered hall call is appropriated to another car. In this event, the car first to stop at such floor cancels the hall call registered upon the other car. For example, assuming that a down second floor hall call has been registered and appropriated to car B, relay B2DR is operated, and contacts B2DR2 and B2DR3 thereof are closed, as shown in Fig. 3. The other contacts of this relay have no effect in connection with the operation now being described.

If car A stops at the second floor traveling downwardly, contacts 2DP2 and M2 associated therewith are closed at the time it arrives at such floor. These contacts complete a circuit in Fig. 3 from minus through contacts M2, contacts 2PD2, contacts B2DR3, reset coil B2DRC, and contacts B2DR2 to plus. Relay B2DR accordingly resumes the deenergized position and the down second floor lantern B2DL is extinguished.

As previously mentioned, in the event one car passes another car traveling in the corresponding direction, floors previously in the zone of the overtaken car are transferred to the zone of the overtaking car through action of the common zoning relays. Any calls appropriated to a particular car, however, remain appropriated to that same car, and are not affected by the exchange of zones. Also, a reoperation of the corresponding floor button after such an exchange of zones does not register a call on the overtaking car. As shown in Fig. 3, selective resistors IRU, 2RD, etc., are connected in series with each hall button, and also in series with a plurality of branch circuits, each of which includes a floor relay individual to a car. Upon completion of any branch circuit, the voltage drop through the corresponding selective resistor is such that a relay in the second branch circuit does not receive sufficient current to operate it. With this arrangement, two cars cannot have appropriated to them at any given time a hall call for the same floor and direction.

Quota mechanism

Referring to Fig. 5, the circuit for quota relay Q associated with car A includes contacts on each of the floor relays individual to car A. As soon as the number of calls which represents the predetermined quota for car A, have been registered, the then closed contacts on the corresponding floor relays increase the excitation of the coil of relay Q to a value sufficient to operate it. Upon operation, relay Q opens its contacts QI in Fig. 4 and prevents completion of any zoning relay circuit for car A. As long, therefore, as relay Q remains operated, no further hall calls can be appropriated to car A. Previously appropriated calls are not affected, however, since, as previously mentioned, each floor relay upon operation closes a self-holding circuit independent of the zoning relays. Relay Q and its associated circuit are preferably designed so that after having been operated, relay Q remains in the operated position, even though all the calls appropriated to car A are answered, in which event all of the floor relay contacts 5DR4, 3DR4, etc., are again opened. Contacts W5 and X5 on the up and down direction relays respectively are provided to reset relay Q each time car A reverses.

With this arrangement, assuming that car A during upward travel has its quota of upward calls, relay Q operates, preventing appropriation of further calls to car A. When car A reaches the upper terminal or reverses at an intermediate floor, relay Q is reset. Assuming, however, that sufficient additional calls are received to refill the quota, relay Q again operates and prevents appropriation of further calls to car A until another reversal occurs.

The system may be alternatively arranged so that resetting of the quota relay Q occurs only once per complete round trip of the car, preferably at the lower terminal floor. In Fig. 5, this alternative operation is provided by means of a limit switch 38, preferably incorporated in floor selector 20 and arranged to operate in response to the approach of the car to the selected floor but not in response to departure of the car from such floor. Throwover switch 39 in one position connects relay Q for control by contacts W5 and X5 and in the other position for control by limit switch 38.

As thus far described, quota relay Q operates only in the event that the number of unanswered calls appropriated to a given car reaches the predetermined quota. The system may be alternatively arranged so that quota relay Q operates as soon as the number of calls appropriated to car A reaches the required quota, although the number of unanswered calls appropriated to car A may never reach the quota figure. It may be noted that this latter arrangement limits the number of stops that a car will make on a particular trip, while the first described arrangement limits only the number of unanswered calls which may be appropriated to a given car at a given time.

The just mentioned latter arrangement is provided in the illustrated embodiment of the present invention by providing each of the floor relay contacts which are connected in the circuit of quota relay Q, with an auxiliary retaining electromagnet, the coils of which are shown in Fig. 5 immediately below contacts 5DR3, 5DR4, etc., and designated "Retaining Coils". The arrangement is preferably such that the auxiliary electromagnets are effective to maintain the associated contact members in closed position, but are not effective to initially move them to the closed positions. Throwover switch 40 is provided to connect and disconnect these auxiliary retaining coils. The circuit therefor is also arranged for control by contacts X5 and W5 or by limit switch 38, so that they are deenergized each time quota relay Q is reset.

In accordance with the present invention, the required quota may be varied automatically in response to varying traffic conditions. As shown in Fig. 5, quota varying relay QR has a contact associated with each car of the bank, contact QR1 being shown in the circuit of relay Q, and contact QR2 being shown in the circuit of relay BQ. The coil of relay QR is connected in a circuit including a resistor 18, parts of which are arranged to be commutated by contacts on the up and down floor relays associated with all of the cars in the bank. Assuming that a predetermined number of unanswered calls exist, represented by a closed condition of a predetermined number of these floor relay contacts, independently of the distribution of these calls between the several cars, relay QR operates contacts QR1 and QR2. These contacts control an additional section of resistance in the circuits of the associated quota relays, and consequently vary the number of calls which must be appropriated to a particular car to cause operation of the quota relay Q or BQ for that car. They may be arranged to either increase or decrease the quota, but are here considered as increasing it, and so are shown as normally closed. As illustrated, this adjustment is accomplished in a single step. It may, of course, be similarly accomplished in a plurality of separate steps. The difference between the number of unanswered calls required to operate relay QR and that required to cause relay QR to resume the deenergized position depends, of course, upon the design characteristic of relay QR, and is determined by traffic conditions.

Some of the novel features in the foregoing specification will be found claimed in the co-pending application of Richard W. Jones, Serial No. 754,987, filed November 27, 1934, and assigned to the same assignee as this one.

The described embodiment of the present invention is merely illustrative, and numerous departures from the illustrated construction and arrangement may be made within the scope thereof.

I claim as my invention:

1. In a system for operating an elevator car past a plurality of floors; call registering means for each of said floors and mechanism disposed to respond thereto; and quota mechanism for controlling the response of said mechanism comprising a first element operably responsive to the number of operated call registering means and a second element for restoring said first element to non-operated condition.

2. In a system for operating an elevator car past a plurality of floors; call registering means for each of said floors and mechanism disposed to respond thereto; and quota mechanism for controlling the response of said mechanism comprising a first element operably responsive to the number of operated call registering means and a second element responsive to the movements of said car for controlling said first element.

3. In a system for operating an elevator past a plurality of floors; call registering means for each of said floors and mechanism disposed to respond thereto; and means to control the response of said mechanism comprising an element responsive to the number of operated call registering means and an element responsive to the approach of said car to one of said floors for controlling said first mentioned element.

4. In a system for operating an elevator car past a plurality of floors; means for determining the direction of travel of said car; call registering means for each of said floors and mechanism disposed to respond thereto; and quota mechanism for controlling the response of said mechanism comprising a first element operably responsive to the number of operated call registering means and a second element responsive to said direction determining means for rendering said first element ineffective.

5. In a system for operating an elevator car past a plurality of floors, call registering means for each of said floors, mechanism disposed to respond to said call registering means, means controlled in accordance with the number of operated call registering means for controlling the response of said mechanism and mechanism operable as said car approaches one of said floors for controlling said last-named means.

6. In a system for operating an elevator car past a plurality of floors, call registering means for each of said floors, mechanism disposed to respond to said call registering means, means responsive to a predetermined number of operated call registering means for rendering said mechanism ineffective to respond, and means operable as said car approaches one of said floors to render said mechanism effective to respond.

7. In a system for operating an elevator car past a plurality of floors, call registering means for each of said floors and mechanism responsive thereto, means operable upon the response of said mechanism to a predetermined number of operated call registering means to render said mechanism non-responsive to further operated call registering means, and means responsive to the approach of said car to one of said floors to render said last-named means ineffective.

8. A system for operating an elevator car past a plurality of landings, means for determining the direction of travel of said car; call registering means for each of said floors; and mechanism responsive thereto; quota means operable upon the response of said mechanism to a predetermined number of operated call registering means to render said mechanism ineffective to respond to further operated call registering means; and means responsive to said direction determining means for rendering said quota means ineffective.

9. In a system for operating a plurality of elevator cars past a plurality of floors; a switch for each of said floors; mechanism for each of said cars responsive to said switches; and quota mechanism for limiting the response of said mechanism to certain groups of said switches comprising an element operably responsive to said switches and arranged to be maintained in operated condition after having been operated, and an element responsive to car movement for resetting said quota mechanism.

10. In a system for operating a plurality of elevator cars past a plurality of floors; a switch for each of said floors; mechanism for each of said cars responsive to said switches; and quota mechanism for limiting the response of said mechanisms to certain groups of said switches comprising an element operably responsive to said switches and arranged to be maintained in operated condition after having been operated, and an element responsive to the approach of a car to one of said floors for resetting said quota mechanism.

11. In a system for operating a plurality of elevator cars past a plurality of floors; a switch for each of said floors; mechanism for each of said cars responsive to said switches; and individual quota mechanism for each of said cars for controlling the response of the said mechanism for the associated car to said switches, said quota mechanism comprising an element operably responsive to the number of switches operated and arranged to be maintained in operated condition after having been operated, and an element responsive to movement of the associated car for resetting the corresponding quota mechanism.

12. In a system for operating a plurality of elevator cars past a plurality of floors; a switch for each of said floors; mechanism for each of said cars responsive to said switches; means for determining the direction of travel of each of said cars; and quota mechanism for each of said cars for controlling the response of the said mechanism for the associated car to said switches comprising an element responsive to said switches and arranged to be maintained in operated condition after having been operated and an element controlled by said direction determining means for resetting said quota mechanism.

13. In a system for operating a plurality of elevator cars past a plurality of floors, means for said floors for registering calls for service; means for each of said cars for responding to calls for service; quota mechanism operable to limit the number of calls to which said cars shall respond; means rendered effective upon operation of said quota mechanism to prevent response by a car to calls for service until that car reaches a selected one of said floors, and means effective when said last-mentioned car reaches said selected one of said floors for restoring said last-mentioned car to condition to respond to calls for service.

14. In a system for operating a plurality of elevator cars past a plurality of floors, means for said floors for registering calls for service; means for each of said cars for responding to calls for service; individual quota mechanism for each of said cars operable to limit the number of calls to which the associated car shall respond, means rendered effective upon operation of the quota mechanism for any of said cars for preventing response to calls by that car until that car reaches a selected one of said floors, and means effective when said last-mentioned car reaches said selected one of said floors for restoring said last-mentioned car to condition to respond to calls for service.

15. In a system for operating a plurality of elevator cars past a plurality of floors; call means for said floors for registering calls for service; mechanism for each of said cars for responding to said call means; means for each car for determining the direction of travel thereof and comprising means operated in the course of each reversal of the motion of the associated car; quota mechanism for each of said cars operably responsive to the number of calls for service; and means rendered effective upon operation of the quota mechanism for any of said cars for rendering the mechanism for that car ineffective to respond to calls for service until operation of said reversal means.

16. A system for operating a plurality of elevator cars past a plurality of floors comprising a switch for each of said floors; a relay for each of said floors individual to each of said cars; means for selectively rendering said relays operably responsive to corresponding switches; quota mechanism for each of said cars operably responsive to the number of operated relays for the associated car; and means rendered effective upon operation of the quota mechanism for any of said cars to prevent operation of further relays for that car until said car reaches a selected one of said floors.

17. A system for operating a plurality of elevator cars past a plurality of floors comprising a switch for each of said floors; a relay for each of said floors individual to each of said cars; means for selectively rendering said relays operably responsive to corresponding switches; quota mechanism for each of said cars operably responsive to the number of operated relays for the associated car; and means rendered effective upon operation of the quota mechanism for any of said cars to prevent operation of further relays for that car, direction determining means for each of said cars; and means controlled by said direction determining means for resetting said quota mechanism.

18. In a system for operating a plurality of elevator cars past a plurality of floors, a switch for each of said floors; a relay for each of said floors individual to each of said cars; zoning means jointly controlled by the positions of said cars for selectively rendering said relays operably responsive to corresponding switches; quota mechanism for each of said cars operably responsive to the said relays for the corresponding car; and means rendered effective upon operation of said quota mechanism to render the associated car ineffective to control said zoning means until that car reaches a selected one of said floors.

19. In a system for operating a plurality of elevator cars past a plurality of floors, a switch for each of said floors; a relay for each of said floors individual to each of said cars; zoning means jointly controlled by the positions of said cars for selectively rendering said relays operably responsive to corresponding switches; quota mechanism for each of said cars operably responsive to the said operated relays for the corresponding car; and means rendered effective upon operation of said quota mechanism to render the associated car ineffective to control said zoning means, direction determining means for each of said cars; and means controlled by each of said direction determining means for resetting the said quota mechanism for the associated car.

20. In a system for operating a plurality of elevator cars past a plurality of floors, means for said floors for registering calls for service; mechanism for each car for responding to calls for service; quota mechanism for each of said cars for controlling the response to calls of the associated said car mechanisms; and means controlled in accordance with the calls responded to by the said mechanisms for one of said cars for modifying the operation of the quota mechanisms for another of said cars.

21. In a system for operating a plurality of elevator cars past a plurality of floors, means for said floors for registering calls for service; mechanism for each car for responding to calls for service; quota mechanism for limiting the number of calls to which each of said car mechanisms shall respond; and means controlled in accordance with the number of calls registered for modifying the operation of said quota mechanism.

22. In a system for operating a plurality of elevator cars past a plurality of floors, means for said floors for registering calls for service; mechanism for each car for responding to calls for service; quota mechanism comprising means responsive to operation of the said car mechanisms for limiting the number of calls to which the associated car shall respond; and means controlled in accordance with the number of calls registered for modifying the operation of said quota mechanism.

23. In a system for operating a plurality of elevator cars past a plurality of floors, means for said floors for registering calls for service; zoning means controlled in accordance with the positions of said cars for defining zones of floors for said cars and for selectively rendering said cars effective to respond to calls in associated zones; quota mechanism for also controlling the response to calls by said cars comprising means responsive to calls registered for floors in the zone for one of said cars for controlling the response to calls by another of said cars.

24. In a system for operating a plurality of elevator cars past a plurality of floors, a switch for each of said floors; a relay for each of said floors individual to each of said cars; zoning means jointly controlled by the positions of said cars for selectively rendering said relays operably responsive to corresponding switches; quota mechanism for each of said cars responsive to operated relays for the associated car for controlling the response of the relays for that car to said switches; and means responsive to operated relays for others of said cars for modifying the operation of said quota mechanism for said associated car.

25. In a system for operating a plurality of elevator cars past a plurality of floors, a switch for each of said floors; a relay for each of said floors individual to each of said cars; zoning means jointly controlled by the positions of said cars for selectively rendering said relays operably responsive to corresponding switches; quota mechanism for each of said cars responsive to operated relays for the associated car for controlling the response of the relays for that car to said switches; and means responsive to operated relays for all of said cars for modifying the operation of said quota mechanism for said associated car.

26. In a system for operating a plurality of elevator cars past a plurality of floors, a switch for each of said floors; a relay for each of said floors individual to each of said cars; zoning means jointly controlled by the positions of said cars for selectively rendering said relays operably responsive to corresponding switches; quota mechanism for each of said cars responsive to a predetermined number of operated relays for the associated car for controlling the response of the relays for that car to said switches; and means responsive to operated relays for others of said cars for modifying said predetermined number.

27. In a system for operating a plurality of elevator cars past a plurality of floors, means for registering calls for service for said floors; means comprising a relay for each of said floors individual to each of said cars; means for selectively rendering said relays responsive to calls for service; and means rendered effective upon operation of a relay for one of said cars to prevent operation of a corresponding relay for another of said cars comprising resistance associated with said relays.

28. In a system for operating a plurality of elevator cars past a plurality of floors, means for registering calls for service for said floors; means comprising a relay for each of said floors individual to each of said cars; means for selectively rendering said relays responsive to calls for service; and means rendered effective upon operation of a relay for one of said cars to prevent operation of a corresponding relay for another of said cars comprising resistance means electrically connected to said relays.

29. In a system for operating a plurality of elevator cars past a plurality of floors, means for registering calls for service for said floors; means comprising a relay for each of said floors individual to each of said cars; means for selectively rendering said relays responsive to calls for service; and means rendered effective upon operation of a relay for one of said cars to prevent operation of a corresponding relay for another of said cars comprising a resistor for each of said floors electrically connected to the relays for the corresponding floors.

30. In a system for operating a plurality of elevator cars past a plurality of floors, call means for said floors; mechanism for each of said cars for responding to said call means; and means effective, in the event more than one of said cars are at a selected one of said floors for selectively controlling the response of said mechanisms to said call means in accordance with the order of arrival of said more than one cars at said floors.

31. In a system for operating a plurality of elevator cars past a plurality of floors, call means for said floors; mechanism for each of said cars for responding to said call means; quota mechanism comprising means responsive to operation of said car mechanisms for limiting the number of calls to which the associated car shall respond; and means effective, in the event that more than one of said cars are at a selected one of said floors for selectively controlling the response of said mechanisms to said call means in accordance with the order of arrival of said more than one cars at said floors.

32. In a control system for a plurality of cars operating past a plurality of floors, means associated with each car for dividing the shaft into zones, each zone extending from the position of any one car to the position of the car ahead, each zone being a multiple of floor heights in length; a push button at each floor common to the bank of cars, call registering mechanism including an element for each car for each floor, additional means associated with each car for electrically connecting the push buttons at each floor of a zone to the call registering mechanism for the associated floors individual to the car controlling the zone in which the associated floor occurs, said call registering mechanism for each car being responsive to the operation of the connected push button to register a call to stop said car at the floor corresponding to the operated push button; transfer mechanism responsive to the approach of a following car to a leading car a predetermined distance for disconnecting the push buttons of floors in said leading cars zone from said leading cars call registering mechanism and for immediately connecting said push buttons to the call registering mechanism of said following car that are associated with said floors.

33. In a control system for a plurality of cars operating past a plurality of floors, means associated with each car for dividing the shaft into zones, each zone extending from the position of any one car to the position of the car ahead, each zone being a multiple of floor heights in length; a push button at each floor common to the bank of cars, call registering mechanism including an element for each car for each floor, additional means associated with each car for electrically connecting the push buttons at each floor of a zone to the call registering mechanism for the associated floors individual to the car controlling the zone in which the associated floor occurs, said call registering mechanism for each car being responsive to the operation of the connected push button to register a call to stop said car at the floor corresponding to the operated push button; transfer mechanism responsive to the approach of a following car to a leading car a predetermined distance for disconnecting the push buttons of floors in said leading cars zone from said leading cars call registering mechanism and for immediately connecting said push buttons to the call registering mechanism of said following car that are associated with said floors, and additional means to render ineffective for registering calls on the second car the push buttons which have been operated to register calls on the first car.

WILLIAM F. EAMES.